United States Patent [19]

Moses

[11] 4,264,689

[45] Apr. 28, 1981

[54] ADDITIVE FOR ELECTROCHEMICAL CELL STABILITY

[75] Inventor: Peter R. Moses, Windham, N.H.

[73] Assignee: Duracell International Inc., Bethel, Conn.

[21] Appl. No.: 80,891

[22] Filed: Oct. 1, 1979

[51] Int. Cl.³ .............................................. H01M 4/50
[52] U.S. Cl. .................................. 429/194; 429/224; 29/623.1
[58] Field of Search .............. 429/194, 195, 197, 224, 429/50; 29/623.1

[56] References Cited

U.S. PATENT DOCUMENTS

| | | | |
|---|---|---|---|
| 4,133,856 | 1/1979 | Ikeda et al. | 429/224 |
| 4,160,070 | 7/1979 | Margalit | 429/194 |
| 4,163,829 | 8/1979 | Kronenberg | 429/194 |
| 4,184,017 | 1/1980 | Kelsey et al. | 429/197 |

Primary Examiner—Donald L. Walton
Attorney, Agent, or Firm—Ronald S. Cornell; Israel Nissenbaum; Martin M. Glazer

[57] ABSTRACT

A nonaqueous electrochemical cell and a method for the construction thereof wherein the cell contains a metal salt additive such as lithium nitrate ($LiNO_3$) or calcium nitrate $Ca(NO_3)_2$ which reduces the reactivity of substantially the entire active cathode surface. Electrolyte solvents such as propylene carbonate are thereby substantially prevented from reacting, on the surface of the cathode, with oxidizing agents within the cell. Decomposition of the electrolyte solvent with gaseous evolution is substantially reduced and cell stability is enhanced. The metal salt additives are particularly useful in nonaqueous cells containing manganese dioxide cathodes.

26 Claims, No Drawings

ADDITIVE FOR ELECTROCHEMICAL CELL STABILITY

This invention relates to nonaqueous electrochemical cells, particularly those containing oxidizable electrolyte solvents susceptible to gaseous evolution and more particularly to such cells containing manganese dioxide cathodes.

Recent developments in high energy density electrochemical cell systems (those containing active metal anodes such as lithium and nonaqueous electrolyte solvents) have included the utilization of substantially beta-manganese dioxide (about 95% beta) as solid cathode materials. In order to successfully utilize such cathode materials in nonaqueous cells the manganese dioxide is subjected to several rigorous (above 200° C.) heating steps in order to first convert electrolytic gamma-manganese dioxide to the substantially beta-manganese dioxide (hereinafter referred to as beta-$MnO_2$). After cathode formation, with a binder such as polytetrafluoroethylene (PTFE) and optionally conductive diluents such as carbon or graphite, into a form such as a pellet, the cathode is rigorously heated to drive off substantially all of the retained water. As described in U.S. Pat. No. 4,133,856 the first heating step is conducted at a temperature between 350°–430° C. with the second heating step of the formed cathode being at a temperature of 200°–350° C. Temperatures below 200° C. in the second heating step are described as resulting in substantial reduction of cell capacity.

In my co-pending patent application Ser. No. 70,198 filed Aug. 27, 1979 I disclosed that the probable cause of the reduction of cell capacity, noted above, results from a loss of cell stability engendered by the interaction among the propylene carbonate (PC) electrolyte solvent, lithium perchlorate electrolyte salt and retained water within the cell. This interaction results in a decomposition of the propylene carbonate with detrimental gaseous (presumably $CO_2$) evolution. It was discovered, as described in the aforesaid application, that by substitution of other specific electrolyte solvents and/or electrolyte salts such detrimental gaseous evolution could be minimized without the necessity of rigorous heat treatment as required in said U.S. Pat. No. 4,133,856. However, electrolyte solvents such as propylene carbonate and electrolyte salts such as lithium perchlorate are preferred as cell constituents because of their high conductivities despite their shortcomings of cell instability, unless the formed cathodes are rigorously heat treated.

It is an object of the present invention to provide a method of making nonaqueous cells whereby decomposable gas evolving electrolyte solvents may be utilized therein without the need for rigorous heat treatment of the formed cathodes thereof.

It is a further object of the present invention to provide a cell having metal salt additives therein which substantially retard decomposition of an electrolyte solvent therein and resultant gas evolution.

It is a still further object of the present invention to provide a cathode for said cell, wherein such cathode does not function as a reaction site for the solvent decomposition.

These and other objects, features and advantages of the present invention will be more clearly seen from the following discussion.

Generally the present invention comprises a method of making a stabilized nonaqueous electrochemical cell and specifically one which contains an electrolyte solvent subject to interaction with other cell components with resulting gaseous evolution. As described in my co-pending application, it is believed that the decomposition of the electrolyte solvent occurs as the result of interaction between the solvent and an electrolyte salt dissolved therein, which has been converted into a strong oxidizing agent by retained water in the cell. It is now further postulated that another factor in the decomposition process is that of a reaction site for such decomposition afforded by the cathode material. It has been discovered that by partially deactivating substantially the entire active surface reaction sites of the cathode, prior to initial cell discharge, decomposition and gaseous evolution from the electrolyte solvent is substantially reduced. Preferably, such partial deactivation results from a thorough dispersal of a deactivating metal salt within said cathode. The deactivation of the active cathode surface should however be minimal in depth such that the cathode does not suffer any substantial reduction of electrochemical characteristics and accordingly it is further preferred that the metal salt be present in the cathode in additive amounts up to about 5% by weight.

Examples of additive salts which have been found to partially deactivate the active surface of the cathode and which thereby reduce solvent decomposition and gas evolution, include nitrate salts such as lithium and calcium nitrate as well as other alkali and alkaline earth metal nitrates and nitrites. It is a characteristic of metal salts utilized as additives in cells of the present invention that they react with the active surface functional groups on the cathode surface to alter them to a less active state. Such reactions may either be a chemically induced partial cell discharge prior to actual cell discharge, or a spontaneous or heat induced reaction of the active metal salt with the active cathode surface. Such reactions partially deactivate substantially all of the cathode surface from functioning as a site for decomposition of the electrolyte solvent.

It is preferred that the preparation of the cathode with metal salt additive comprises thoroughly mixing powdered active cathode material with a solution of the metal salt additive evaporating the solvent and thereafter treating the mixture such as by heat, if necessary, to effect the reaction and the partial deactivation of substantially the entire active cathode surface. Utilizaton of the solvated salt in the mixture ensures intimate contact with substantially all of the cathode surface. The surface deactivated cathode material is then formed into a cathode for insertion within a cell in accordance with standard procedures without the necessity of additional rigorous heat treatment of the formed cathode. Alternatively, the metal salt present in the completed cell operates to partially deactivate the active surface of the cathode once the cell is fully constructed with an active metal anode (metals above hydrogen in the EMF series) such as lithium, the reactive cathode and nonaqueous electrolyte solution. Such metal salt is selected whereby it partially discharges the cathode thereby also deactivating the surface of the cathode since discharge reactions are initiated at the cathode surface. The metal salt additive is particularly effective when in close proximity with the cathode such as by admixture therewith. However, it may also be present in the electrolyte of the cell.

The present invention has particular utility in combination with a manganese dioxide cathode since it is a required first step for nonaqueous electrolyte cells that gamma-manganese dioxide be converted to the beta-$MnO_2$ by a rigorous heat treatment between 375°–400° C. Accordingly by initially mixing a metal salt such as lithium or calcium nitrate with the gamma-manganese dioxide, conversion to the beta-$MnO_2$ occurs simultaneously with the thermally initiated reaction of the lithium or calcium nitrate with the cathode surface and the deactivation of the active beta-$MnO_2$ surface. A second rigorous heating step after cathode formation such as is required in U.S. Pat. No. 4,133,856 is obviated even with the utilization of electrolyte solvents which are decomposable, with gaseous evolution, in the presence of strong oxidizing agents such as are engendered by a reaction between a lithium perchlorate salt and retained water. Thus oxidizable electrolyte solvents with gaseous decompositon products such as propylene carbonate (PC) and dimethoxyethane (DME), such as have been used in nonaqueous cells containing beta-$MnO_2$, may be utilized even in conjunction with electrolyte salts such as perchlorates, hexafluoroarsenates and trifluoroacetates which form strong oxidizing agents in the presence of water.

Since it is water retention within the cell and particularly in the cathode which initiates the decomposition of the electrolyte solvent and the formation of a gaseous reaction product this invention has particular utility in cells having metal oxide cathodes which have strong water retention properties. Examples of metal oxides which retain water include the aforementioned manganese dioxide, $TiO_2$, $SnO$, $MoO_3$, $V_2O_5$, $CrO_3$, $PbO$, $Fe_2O_3$ and generally transition metal oxides. It is however understood that the present invention is also useful wherever retained water exists in a cell which water can initiate decomposition and gaseous evolution from an electrolyte solvent.

Generally cells are constructed with non corrosive metals as containers. Examples of such metals include stainless steel and aluminum with the latter being preferred because of its low weight and cost.

The following examples illustrate the efficacy of the present invention with respect to that of the prior art. Such examples are for illustrative purposes only and details contained therein should not be construed as limitations on the present invention. Unless otherwise indicated, all parts are parts by weight.

EXAMPLE 1 (PRIOR ART)

900 milligrams of gamma-electrolytic manganese dioxide (EMD) are heated to 375° C. for three hours. The gamma-EMD is converted to beta-$MnO_2$ which is then mixed with 60 milligrams of graphite, as conductive diluent, and 40 milligrams of a polytetrafluoroethylene (PTFE) dispersion, as binder. The mixture is formed into a pellet (about 1" (2.54 cm) diameter) and heated to 300° C. under vacuum for 6 hours. The cathode pellet is then assembled into a flat water cell (0.100" (0.254 cm) height by 1" (2.54 cm) diameter) with a lithium foil disc (70 mg) anode, a non-woven polypropylene separator and an electrolyte solution of about 275 mg 1M $LiClO_4$ in an equivolume mixture of PC/DME. The open circuit voltage is determined as being 3.61 volts. The completed cell is heated to 115° C. for one hour and cooled to room temperature with an expansion of 0.003 inch (0.00762 cm). A second cell constructed identically but stored at room temperature for 45 days shows no significant expansion.

EXAMPLE 2 (MODIFIED PRIOR ART)

A cell is made in an identical manner as that of Example 1 but with the cathode pellet being heated to 150° C. rather than to 300° C. When the cell is heated to 115° C. for one hour and cooled the expansion is about 0.040 inch (0.10 cm). A second cell made as above and stored for 45 days at room temperature expands by about 0.010 inch (0.0254 cm).

EXAMPLE 3

A mixture comprising 900 milligrams of gamma-EMD and 1 milligram of lithium nitrate dissolved in 25 ml of water is dried to evaporate the water. The lithium nitrate deposited gamma-EMD is then heated at 375° C. for three hours. The resultant material mixed with 60 milligrams of graphite and 40 milligrams of a PTFE dispersion is formed into a cathode pellet as in Example 1, and heated at 150° C. under vacuum for 6 hours. The pellet is then placed into a cell as in Example 1 giving an OCV of 3.49 volts. When the cell is heated at 115° C. for one hour and cooled to room temperature, cell expansion is about 0.010 inch (0.0254 cm). A second cell made as above and stored at room temperature for 45 days shows no significant expansion. When discharged the capacity of the cells are substantially the same as those in Example 1 (about 90% of the theoretical capacity at low rates).

EXAMPLE 4

A cell is made with the materials and treatment as in Example 3 but with 1 milligram of calcium nitrate in place of the lithium nitrate with the mixture being heated to 390° C. Upon heating of the cell to 115° C. for one hour and cooling to room temperature the cell expansion is about 0.020 inch (0.0508 cm).

It is noted that the OCV in Example 3 is somewhat less than those of the cells in Examples 1 and 2 of the prior art. The lower OCV is indicative of the deactivated surface area of the cathode. Such OCV difference does not however significantly affect cell performance during actual discharge.

It is understood that various changes may be made in materials and procedures in the construction of the cathodes and cells of the present invention. The above examples are presented as exemplifying the present invention and any detail contained therein should not be considered as a limitation on the present invention as defined in the following claims.

What is claimed is:

1. A method of stabilizing a nonaqueous electrochemical cell comprising an active metal anode, a cathode having active surface functional groups, and a nonaqueous electrolyte solvent having an electrolyte salt dissolved therein, said method comprising the step of partially deactivating substantially all of the active surface of said cathode prior to initial cell discharge.

2. The method of claim 1 wherein said method comprises the step of including a metal salt within said cathode which reacts with said active surface functional groups on said cathode to alter them to less active states to provide said deactivation.

3. The method of claim 1 wherein said method comprises the step of including a metal salt within said cell which reacts with said cathode to partially discharge said cathode at its surface to provide said deactivation.

4. The method of claim 2 or 3 wherein said metal salt is present in said cathode in amounts up to 5% by weight thereof.

5. The method of claim 1 wherein said cathode is made by the steps comprised of mixing a cathode active material with a metal salt which reacts with and deactivates the surface functional groups of said cathode active material, heating said metal salt to initiate said reaction thereby providing said deactivation of the active surface of said cathode and thereafter forming said cathode.

6. The method of claim 5 wherein said cathode active material comprises electrolytic gamma-manganese dioxide and wherein said gamma-manganese dioxide is converted to beta-$MnO_2$ during said heating of said metal salt.

7. The method of claim 6 wherein said metal salt is selected from the group consisting of alkali and alkaline earth metal nitrates and nitrites.

8. The method of claim 7 wherein said metal salt is selected from the group consisting of lithium and calcium nitrate.

9. The method of claim 8 wherein said metal salt is lithium nitrate.

10. The method of claim 6 wherein said nonaqueous electrolyte solvent is subject to oxidation decomposition and gaseous evolution.

11. The method of claim 10 wherein said electrolyte solvent comprises propylene carbonate.

12. A cell made in accordance with the method of claim 1.

13. The cell of claim 12 wherein said cell comprises a lithium anode, and a beta-$MnO_2$ cathode.

14. The cell of claim 13 wherein said cell further includes an electrolyte solvent comprised of propylene carbonate.

15. The cell of claim 14 wherein said cell further includes a lithium perchlorate electrolyte salt.

16. A method for making a cathode for a nonaqueous electrochemical cell comprising the steps of mixing a cathode active material having active surface functional groups with a metal salt which reacts with and deactivates said surface functional groups of said cathode active material, heating said metal salt to initiate said reaction thereby providing said deactivation of the active surface of said cathode and thereafter forming said cathode.

17. The method of claim 16 wherein said cathode active material comprises electrolytic gamma-manganese dioxide and wherein said gamma-manganese dioxide is converted to beta-$MnO_2$ during said heating of said metal salt.

18. The method of claim 17 wherein said metal salt is selected from the group consisting of alkali and alkaline earth metal nitrates and nitrites.

19. The method of claim 18 wherein said metal salt is selected from the group consisting of lithium and calcium nitrate.

20. The method of claim 19 wherein said metal salt is lithium nitrate.

21. A cell having a cathode made in accordance with claim 19.

22. The cell of claim 21 wherein said cell contains a lithium anode.

23. A cathode for an electrochemical cell made in accordance with the method of claim 19.

24. A cell having a cathode made in accordance with claim 17.

25. The method of claim 4 or 16 wherein said metal salt comprises up to 5% of the mixture of the cathode active material and said metal salt.

26. A cathode for an electrochemical cell made in accordance with the method of claim 16.

* * * * *